United States Patent
Huang et al.

(10) Patent No.: US 12,284,079 B2
(45) Date of Patent: Apr. 22, 2025

(54) FACILITATING PERFORMANCE OF NODE MANAGEMENT ACTIONS IN A COMPUTING INFRASTRUCTURE HAVING DIVERSE NODE INTERFACES

(71) Applicant: Nutanix, Inc., San Jose, CA (US)

(72) Inventors: Tsai Chun Huang, San Jose, CA (US); Manish Sharma, Bangalore (IN); ManjeGowda S G, Hassan (IN); Amit Kumar, Bangalore (IN); Vishal Kumar, Bilaspur (IN); Kumar Sidhartha, Bangalore (IN); N Nanda kumar, Bangalore (IN)

(73) Assignee: NUTANIX, INC., San Jose, CA (US)

( * ) Notice: Subject to any disclaimer, the term of this patent is extended or adjusted under 35 U.S.C. 154(b) by 113 days.

(21) Appl. No.: 17/302,822

(22) Filed: May 13, 2021

(65) Prior Publication Data

US 2022/0182286 A1 Jun. 9, 2022

Related U.S. Application Data

(60) Provisional application No. 63/120,751, filed on Dec. 3, 2020.

(51) Int. Cl.
*H04L 41/0866* (2022.01)
*G06F 9/445* (2018.01)
*G06F 21/45* (2013.01)

(52) U.S. Cl.
CPC ...... *H04L 41/0866* (2013.01); *G06F 9/44526* (2013.01); *G06F 21/45* (2013.01)

(58) Field of Classification Search
CPC . H04L 41/0866; H04L 41/085; H04L 41/082; H04L 41/0213; H04L 41/0803;
(Continued)

(56) References Cited

U.S. PATENT DOCUMENTS 6,609,155 B1 * 8/2003 Taylor ................. H04L 41/0213
709/230
7,003,527 B1 2/2006 Lavallee et al.
(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown); pp. all.

(Continued)

*Primary Examiner* — Alex H. Tran
(74) *Attorney, Agent, or Firm* — IPHORIZONS PLLC; Narendra Reddy Thappeta

(57) ABSTRACT

An aspect of the present disclosure facilitates performance of node management actions in a computing infrastructure having diverse node interfaces. In one embodiment, a configuration data is maintained, the configuration data specifying plugins designed to communicate with different node interfaces installed on the nodes of a computing infrastructure. The plugins are corresponding implementations of a common client interface. Upon receiving from the client application, via the common client interface, a management action to be performed on a desired node, the configuration data is inspected to identify a specific plugin corresponding to the node interface installed on the desired node. The node management action is then performed on the desired node using the identified specific plugin. Accordingly, the client application can be implemented agnostic to the specific node interfaces installed on a node.

16 Claims, 10 Drawing Sheets

(58) Field of Classification Search
CPC ............. H04L 67/306; H04L 2209/603; H04L 2463/101; G06F 9/44526; G06F 21/45; G06F 2009/45579; G06F 9/5077; G06F 2221/2141; G06F 9/541

See application file for complete search history.

(56) References Cited

U.S. PATENT DOCUMENTS

| | | | | |
|---|---|---|---|---|
| 7,689,921 | B2* | 3/2010 | Rajarajan | H04L 41/0856 715/788 |
| 7,747,416 | B2* | 6/2010 | Deininger | G05B 19/41865 714/100 |
| 8,549,518 | B1 | 10/2013 | Aron et al. | |
| 8,601,473 | B1 | 12/2013 | Aron et al. | |
| 8,850,130 | B1 | 9/2014 | Aron et al. | |
| 9,111,214 | B1* | 8/2015 | Sharma | H04W 12/082 |
| 9,772,866 | B1 | 9/2017 | Aron et al. | |
| 10,348,574 | B2* | 7/2019 | Kulkarni | H04L 41/0893 |
| 10,616,230 | B2* | 4/2020 | Singh | H04L 63/108 |
| 11,076,024 | B2* | 7/2021 | Agerstam | H04L 67/12 |
| 2004/0015940 | A1* | 1/2004 | Heisey | G06F 8/65 717/127 |
| 2010/0131654 | A1* | 5/2010 | Malakapalli | H04L 67/08 709/227 |
| 2013/0151841 | A1 | 6/2013 | McGraw | |
| 2016/0014073 | A1 | 1/2016 | Reddy et al. | |
| 2019/0220271 | A1* | 7/2019 | Olderdissen | G06F 9/45558 |
| 2019/0318002 | A1* | 10/2019 | Sharma | H04W 4/80 |
| 2019/0332412 | A1* | 10/2019 | Boggarapu | G06F 9/45558 |
| 2021/0226779 | A1* | 7/2021 | Ruane | G06F 21/57 |
| 2021/0233045 | A1* | 7/2021 | Singh | G06Q 20/12 |
| 2021/0334396 | A1* | 10/2021 | Chopra | G06F 21/64 |
| 2022/0121527 | A1* | 4/2022 | Upadhyay | G06F 11/1435 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown); pp. all.

Poitras, Steven. "The Nutanix Bible" (Jun. 20, 2014), from http://stevenpoitras.com/the-nutanix-bible/ (Publication date based on indicated capture date by Archive.org; first publication date unknown); pp. all.

Poitras, Steven. "The Nutanix Bible" (Jan. 7, 2015), from http://stevenpoitras.com/the-nutanix-bible/ (Publication date based on indicated capture date by Archive.org; first publication date unknown); pp. all.

Poitras, Steven. "The Nutanix Bible" (Jun. 9, 2015), from http://stevenpoitras.com/the-nutanix-bible/ (Publication date based on indicated capture date by Archive.org; first publication date unknown); pp. all.

Poitras, Steven. "The Nutanix Bible" (Sep. 4, 2015), from https://nutanixbible.com/ pp. all.

Poitras, Steven. "The Nutanix Bible" (Jan. 12, 2016), from https://nutanixbible.com/ pp. all.

Poitras, Steven. "The Nutanix Bible" (Jun. 9, 2016), from https://nutanixbible.com/ pp. all.

Poitras, Steven. "The Nutanix Bible" (Jan. 3, 2017), from https://nutanixbible.com/ pp. all.

Poitras, Steven. "The Nutanix Bible" (Jun. 8, 2017), from https://nutanixbible.com/ pp. all.

Poitras, Steven. "The Nutanix Bible" (Jan. 3, 2018), from https://nutanixbible.com/ pp. all.

Poitras, Steven. "The Nutanix Bible" (Jun. 25, 2018), from https://nutanixbible.com/ pp. all.

Poitras, Steven. "The Nutanix Bible" (Jan. 8, 2019), from https://nutanixbible.com/ pp. all.

Poitras, Steven. "The Nutanix Bible" (Jul. 25, 2019), from https://nutanixbible.com/ pp. all.

Poitras, Steven. "The Nutanix Bible" (Sep. 17, 2019), from https://nutanixbible.com/ pp. all.

Cano, Ignacio et al. "Curator: Self-Managing Storage for Enterprise Clusters"; University of Washington; published Mar. 2017; pp. all.

Enabling drivers and hardware types https://docs.openstack.org/ironic/latest/install/enabling-drivers.html, Nov. 30, 2020, 08 Pages.

Intelligent Platform Management Interface User's Guide, https://www.supermicro.com/manuals/other/IPMI_Users_Guide.pdf, Revision 1.1b, Aug. 26, 2020, 195 Pages.

Supermicro Server Management Utilities, https://www.supermicro.com/products/nfo/files/SSM/SSM_brochure.pdf, Apr. 2015, 08 Pages.

IPMI & IPMITOOL, https://www.tzulo.com/crm/knowledgebase/47/IPMI-and-IPMITOOL-Cheat-sheet.html, Nov. 24, 2019, 04 Pages.

Intel®Server Boards andServer PlatformsServer Management Guide, https://www.intel.com/content/dam/support/us/en/documents/motherboards/server/sb/g37830002_servermanagementguide_r3_1.pdf, Oct. 2012, 137 Pages.

Configure the Baseboard Management Controller (BMC) for Remote Monitoring and Control for Intel® Server Boards and Intel® Server Systems, https://www.intel.in/content/www/in/en/support/articles/000007913/server-products.html, retrieved from internet on Dec. 11, 2020, 01 Page.

One Easy Way To Consolidate Your Out-Of-Band Management, Data Center Solutions, Solutions Catalog, https://www.zpesystems.com/wp-content/uploads/2020/10/Solutions-Catalog-2020-NGM.pdf, retrieved from internet on Dec. 11, 2020, 02 Pages.

Vendor-Neutral Common Access Interface, https://www.zpesystems.com/Whitepapers/Nodegrid%20Manager%20-%20Vendor%20Neutral%20Common%20Access%20Interface.pdf, retrieved from internet on Dec. 11, 2020, 05 Pages.

Poitras, Steven. "The Nutanix Bible" (Nov. 16, 2020), from https://nutanixbible.com/ pp. all.

Redfish Scalable Platforms Management API Specification, https://www.dmtf.org/sites/default/files/standards/documents/DSP0266_1.0.2.pdf, DSP # DSP0266, Version 1.0.2, Mar. 31, 2016, 80 Pages.

* cited by examiner

```
{"plugins": [
  {"name": "nx_g7",                                                          ← 441
   "redfish": {"version": "v1"},
   "supported_models": ["NX-1065-G7"],                                       ← 442
   "bmc_version": {
     "unsupported": ["9.9.5"],                                               ← 443
     "supported": [{"min": "9.9","max": "9.11"}]                             ← 444
   },
   "lcm_model_family": "smc_g11"
  }
],
"version": "0.1.0",
"framework_version": {"supported": [{"min": "0.1.0"}]},
"manufacturer": "supermicro"}                                                ← 445
```
⎫
440

FIG. 4C

```
from redpool.base_plugin import get_plugin         ← 501
from credmod import create_user,delete_user        ← 502
```

510 {
```
# With auto-detection.
pl = get_plugin (BMC_IP, USERNAME, PASSWORD)      ← 511
pl.get_power_state ()                              ← 512
pl.power_reset ()                                  ← 513
```

520 {
```
# With auto-detection and credential generated on the fly
user = create_user (BMC_IP)                                          ← 521
pl = get_plugin (BMC_IP, user.get_username(), user.get_password())   ← 522
pl.get_power_state ()                                                ← 523
pl.power_reset ()                                                    ← 524
delete_user (user.get_username())                                    ← 525
```

*FIG. 5A*

FACILITATING PERFORMANCE OF NODE MANAGEMENT ACTIONS IN A COMPUTING INFRASTRUCTURE HAVING DIVERSE NODE INTERFACES

PRIORITY CLAIM

The instant patent application is related to and claims priority from the US provisional patent application entitled, "FACILITATING PERFORMANCE OF NODE MANAGEMENT ACTIONS IN A COMPUTING INFRASTRUCTURE HAVING DIVERSE NODE INTERFACES", Ser. No. 63/120,751, Filed: 3 Dec. 2020, which is incorporated in its entirety herewith.

BACKGROUND OF THE DISCLOSURE

Technical Field

The present disclosure relates to computing infrastructures and more specifically to facilitating performance of node management actions in a computing infrastructure having diverse node interfaces.

Related Art

A computing infrastructure refers to a collection of nodes that may include processing nodes, connectivity infrastructure, data storages, administration systems, etc., which are engineered to together host software applications. Each node typically includes hardware (e.g., CPU, memory, hard, disk, sensors), firmware (e.g. BIOS (basic input/output system)) and system software (such as hypervisor, virtual machine, operating system, etc.) that facilitate hosting of the software applications.

Node management actions, as used in the instant application, refer to low-level actions performed on the hardware, firmware and/or system software present in the nodes. The node management actions may include booting-up the node, shutting down the node, resetting/restarting the node, update of hypervisor/operating system, update of BIOS, capturing Event Logs generated by the system software, etc.

Node interfaces are often provided for performing node management actions on the nodes. The node interfaces are provided by various vendors of the nodes and as such are generally different in their implementations—the interfaces may support different sets of actions, have different names for the same action, use different protocols for communication with the nodes, etc.

It is accordingly desirable to facilitate performance of node management actions in a computing infrastructure having such diverse node interfaces.

BRIEF DESCRIPTION OF THE DRAWINGS

Example embodiments of the present disclosure will be described with reference to the accompanying drawings briefly described below.

FIG. 4C depicts portions of a configuration data specifying the details of a plugin in one embodiment.

FIG. 5A depicts the manner in which plugins are used by clients in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

Figure 1:
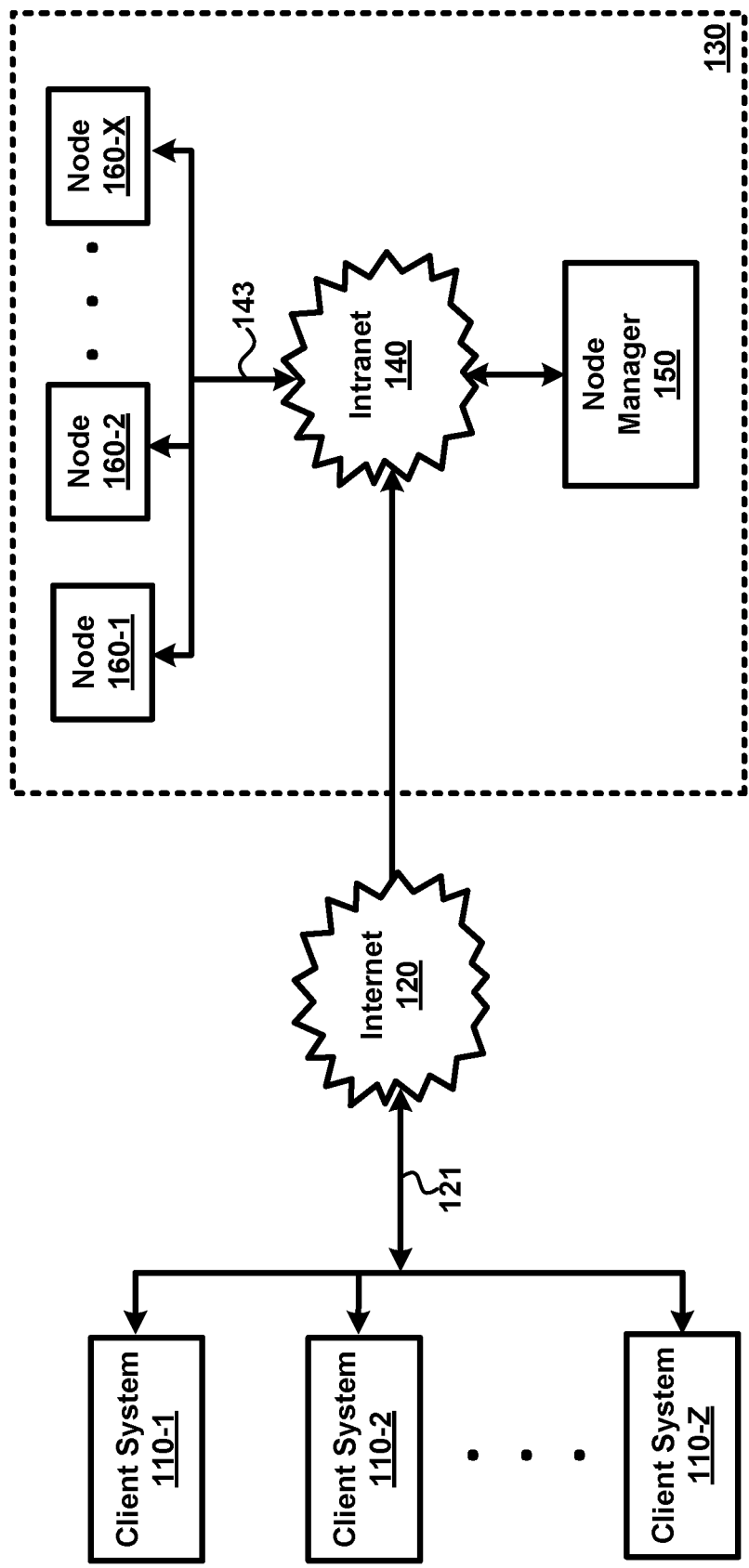
FIG. 1 is a block diagram that illustrates an example environment (computing system) in which several aspects of the present invention can be implemented.

An aspect of the present disclosure facilitates performance of node management actions in a computing infrastructure having diverse node interfaces. In one embodiment, a configuration data is maintained, the configuration data specifying plugins designed to communicate with different node interfaces installed on the nodes of a computing infrastructure. The plugins are corresponding implementations of a common client interface. Upon receiving from the client application, via the common client interface, a management action to be performed on a desired node, the configuration data is inspected to identify a specific plugin corresponding to the node interface installed on the desired node. The node management action is then performed on the desired node using the identified specific plugin.

Accordingly, the client application can be implemented agnostic to the specific node interfaces installed on a node. In addition, the client application is relieved of the burden of keeping track of the different node interfaces implemented in the nodes of the computing infrastructure.

According to one more aspect of the present disclosure, the common client interface is provided to one or more client applications. An indication to access the desired node is received from a client application via the common client interface. The inspecting of the configuration data (to identify the specific plugin) is performed in response to receiving the indication. An association is thereafter maintained between the identified plugin and the client application.

Thus, upon receiving of node management actions from the client application, the specific identified plugin is used, based on the association, for communicating with the node interface installed on the desired node to cause performance of the node management actions. As a result, a plugin may be identified once, and thereafter used for performing multiple node management actions, thereby reducing the overhead associated with the identification of plugins.

According to another aspect of the present disclosure, a new node interface is installed on the desired node at a time instance following the performing of the node management action (noted above). Upon receiving from the client application after the time instance, via the common client interface, another indication to access the desired node, the configuration data is inspected to identify another plugin corresponding to the new node interface installed on the desired node. The association is updated as being between the client application and the another plugin in view of the another indication and the inspecting identifying the another plugin in response to the another indication.

Upon receiving from the client application, via the common client interface, the same node management action to be performed on the desired node, the same node management action is performed using the identified another plugin (based on the updated association), which in turn communicates with the new node interface installed on the desired node. The addition of nodes with new node interfaces from new or existing vendors is accordingly simplified.

According to one more aspect of the present disclosure, the node interface is provided by a first vendor, while the another node interface is provided by a second vendor. According to yet another aspect of the present disclosure, the node interface is an older version provided by a vendor, while the another second node interface is a newer version provided by the same vendor. In one embodiment, the indication and the another indication noted above is an IP (Internet Protocol) address of the desired node. Thus, the client application can be implemented agnostic to any vendor specific implementations of the node interfaces.

According to an aspect of the present disclosure, credentials are required to be sent from a plugin to a node interface for performing a node management action on a desired node. Accordingly, a set of credentials for a new user is generated and the generated set of credentials is provided to a client application. The generated set of credentials are received along with the indication (noted above) from the client application and communicated to the node interface. Accordingly, a client application/developer is relieved of the burden of creating the credentials required for the performance of node management actions.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1 is a block diagram that illustrates an example environment (computing system) in which several aspects of the present invention can be implemented. Each of the Figures is described in detail below. The block diagram is shown containing client systems 110-1 through 110-Z (Z representing any natural number), Internet 120 and computing infrastructure 130. Computing infrastructure 130 in turn is shown containing nodes 160-1 through 160-X (X representing any natural number), intranet 140, and node manager 150. The client systems and nodes are collectively referred to by 110 and 160 respectively.

Merely for illustration, only representative number/type of systems are shown in FIG. 1. Many environments often contain many more systems, both in number and type, depending on the purpose for which the environment is designed. Each block of FIG. 1 is described below in further detail.

Computing infrastructure 130 is a collection of nodes (160) that may include processing nodes, connectivity infrastructure, data storages, administration systems, etc., which are engineered to together host software applications. Computing infrastructure 130 may be a cloud infrastructure (such as Amazon Web Services (AWS) available from Amazon.com, Inc., Google Cloud Platform (GCP) available from Google LLC, etc.) that provides a virtual computing infrastructure for various customers, with the scale of such computing infrastructure being specified often on demand.

Alternatively, computing infrastructure 130 may correspond to an enterprise system (or a part thereof) on the premises of the customers (and accordingly referred to as "On-prem" infrastructure). Computing infrastructure 130 may also be a "hybrid" infrastructure containing some nodes of a cloud infrastructure and other nodes of an on-prem enterprise system.

All the nodes (160) of computing infrastructure 130 are assumed to be connected via intranet 140. Internet 120 extends the connectivity of these (and other systems of the computing infrastructure) with external systems such as client systems 110. Each of intranet 140 and Internet 120 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by Internet 120 and intranet 140. When the packet contains content such as port numbers, which specifies a target application, the packet may be said to be directed to such application as well.

Each of client systems 110 represents a system such as a personal computer, workstation, mobile device, computing tablet etc., used to generate client requests directed to software applications executing in computing infrastructure 130. A client request refers to a specific technical request (for example, Universal Resource Locator (URL) call) sent to a server system from an external system (here, client system) over Internet 120, typically in response to a user interaction at client systems 110. The client requests may be generated by users using appropriate user interfaces (e.g., web pages provided by an application executing in a node, a native user interface provided by a portion of an application downloaded from a node, etc.).

In general, a client system requests a software application for performing desired tasks and receives the corresponding responses (e.g., web pages) containing the results of performance of the requested tasks. The web pages/responses may then be presented to a user by a client application such as the browser. Each client request is sent in the form of an IP packet directed to the desired system or software application, with the IP packet including data identifying the desired tasks in the payload portion.

Some of nodes 160 may be implemented as corresponding data stores. Each data store represents a non-volatile (persistent) storage facilitating storage and retrieval of data by software applications executing in the other systems/nodes of computing infrastructure 130. Each data store may be implemented as a corresponding database server using relational database technologies and accordingly provide storage and retrieval of data using structured queries such as SQL (Structured Query Language). Alternatively, each data store may be implemented as a corresponding file server providing storage and retrieval of data in the form of files organized as one or more directories, as is well known in the relevant arts.

Some of the nodes 160 may be implemented as corresponding server systems. Each server system represents a server, such as a web/application server, constituted of appropriate hardware executing software applications capable of performing tasks requested by client systems 110. A server system receives a client request from a client system and performs the tasks requested in the client request. A server system may use data stored internally (for example, in a non-volatile storage/hard disk within the server system), external data (e.g., maintained in a data store) and/or data received from external sources (e.g., received from a user) in performing the requested tasks. The server system then sends the result of performance of the tasks to the requesting client system (one of 110) as a corresponding response to the client request. The results may be accompanied by specific user interfaces (e.g., web pages) for displaying the results to a requesting user.

It may be desirable to perform node management actions on nodes 160 in computing infrastructure 130. In one embodiment, different vendors (such as HP®, Dell®, Intel®, etc.) of nodes 160 provide corresponding node interfaces for performing node management actions on the nodes having the vendor's hardware. The manner in which node interfaces are provided by vendors and the manner in which the nodes may be managed in a prior approach is described below with respect to FIG. 2.

3. Prior Approach

Figure 2:
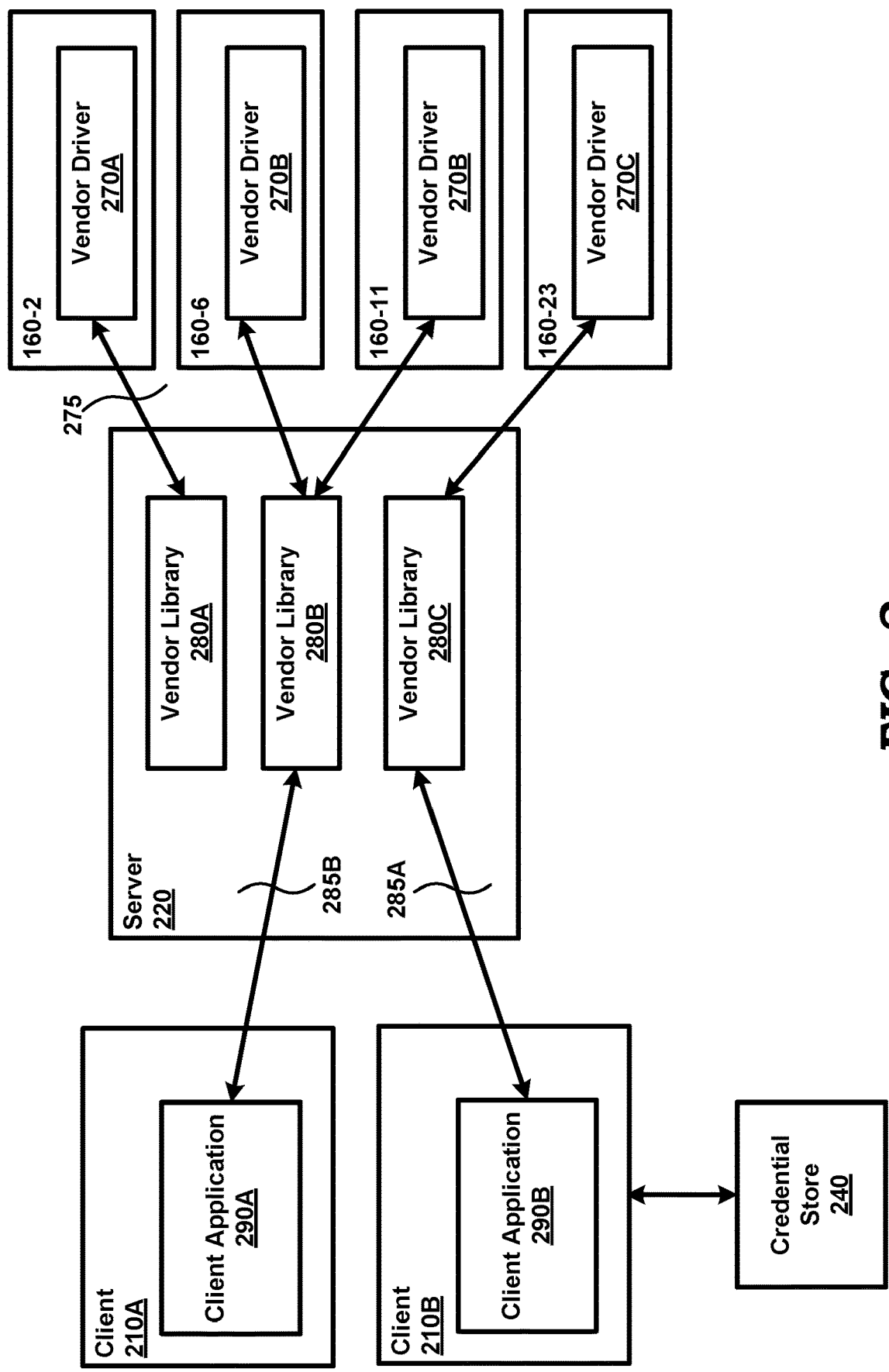
FIG. 2 is a block diagram illustrating vendor specific node interfaces provided in one prior embodiment.

FIG. 2 is a block diagram illustrating vendor specific node interfaces provided in one prior embodiment. The block diagram is shown containing client 210A-210B, server 220, credential store 240, vendor driver 270A-270C, vendor library 280A-280C and client application 290A-290B. Each block of FIG. 2A is described below in further detail.

Each of vendor driver 270A-270C represents a corresponding module installed (typically, pre-installed as part of the bare machine) on a node (e.g., 160-2), which enables node management actions to be performed on the node. In one embodiment, a vendor driver also includes a BMC (Baseboard Management Controller) hardware that can be used to perform management operations on the nodes. Vendor driver 270A, 270B, 270C represent the vendors drivers provided by three different vendors.

Each of vendor library 280A-280C represents a corresponding module provided on a server 220 (e.g., one of nodes 160) which facilitates client applications/users to interface with the corresponding vendor drivers installed on the nodes. Users/client applications may invoke (285A, 285B, etc.) the desired methods/procedures (corresponding to the desired node management actions to be performed) exposed by the vendor library (e.g., 280A) which in turn communicates (275) with the corresponding vendor driver (here, 270A) to cause the performance of the desired management actions on the node (here, 160-2). Vendor library 280A, 280B, 280C represent the vendors libraries corresponding to vendor driver 270A, 270B and 270C and are provided by the three different vendors providing the vendor drivers.

It may be appreciated that each of client interfaces 285A and 285B exposed by corresponding vendor library (280C and 280B respectively) are different and vendor dependent. As a result, for example, a same node management action may have different syntax/semantics (name, parameters, etc.) for invocation of that node management action in the two libraries.

Each of client application 290A-290B represents an application that causes performance of node management actions on nodes 160. A client application (for example, client application 290A executing in client 210A) may be a browser application used by a user/customer to send client requests for performance of desired node management actions, and as such the client (290A) maybe one of client systems 110 (e.g., client system 110-5).

Alternatively, a client application (for example, client application 290B executing in client 210B) may be a middleware application with the client (290B) being one of nodes 160 (e.g., 160-20) implemented as a server system. An example of a middleware application is LCM (Life Cycle Management) application which manages the lifecycle of other software applications hosted in computing infrastructure 130.

Credential store 240 represents a non-volatile (persistent) storage facilitating storage and retrieval of data by software applications (e.g., client application 290B) executing in client 210B. In particular, credential store 240 maintains the credentials (e.g., username and password) required for performance of the node management actions on different nodes 160. Each user/client application is provided with corresponding different credentials, thereby enabling vendor driver 270A-270C to verify/authenticate the requesting user/client application prior to performance of any node management action received from the corresponding vendor library.

In one approach, client application 290B (assumed to be LCM middleware application, for illustration) collects credentials from a user and then stores the collected credentials in credential store 240. Client application 290B then receives a request for performance of a desired node management action on a specific node (assumed to be node 160-23, for illustration). In one embodiment, the specific node is identified by a corresponding IPMI (Intelligent Platform Management Interface) IP address.

In response to the request, client application 290B retrieves the credentials from credential store 240 and sends the retrieved credentials along with the requested node management action to one of vendor library 280A-280C. It should be noted that client application 290B is required to know the specific vendor library (280C) corresponding to the vendor driver (270C) installed on the specific node (node 160-23). Vendor library 280C, in turn sends appropriate packets to vendor driver 270C installed on the specific node to cause the performance of the desired node management action.

It may be appreciated that the customer/user has to enter the usernames and passwords for all the IPMI in all the nodes (for utilizing the desired node interactions). Usually, a customer does not have common credentials for all the IPMI IPs. Thus, the customer is required to go and enter each of them individually and add the details to the credential store before consuming any node interactions. Such manual entry consumes both time and effort.

It may be further appreciated that the node interfaces (each a combination of a vendor library and a vendor driver) are generally provided by corresponding vendors who provided the nodes. Though all vendors are trying to provide the same set of node management actions, the vendors typically use their own client interface implementations for performance of the node management functions. In addition, different node interfaces have different mechanisms (275) to talk to their BMCs (vendor drivers).

One challenge with a computing infrastructure having such disparate/diverse node interfaces is scalability. Addition of nodes to the computing infrastructure requires the knowledge of implementation details of the node interfaces supported by the added nodes. Such addition is further compounded when onboarding/adding new vendors, and correspondingly new node interfaces.

Node manager 150, provided according to several aspects of the present disclosure, facilitates performance of node management actions in a computing infrastructure (130) having diverse node interfaces. Though shown internal to computing infrastructure 130, in alternative embodiments, node manager 150 may be implemented external to computing infrastructure 130, for example, as a system connected to Internet 120. The manner in which node manager 150 facilitates performance of node management actions is described below with examples.

4. Facilitating Performance of Node Management Actions

Figure 3:
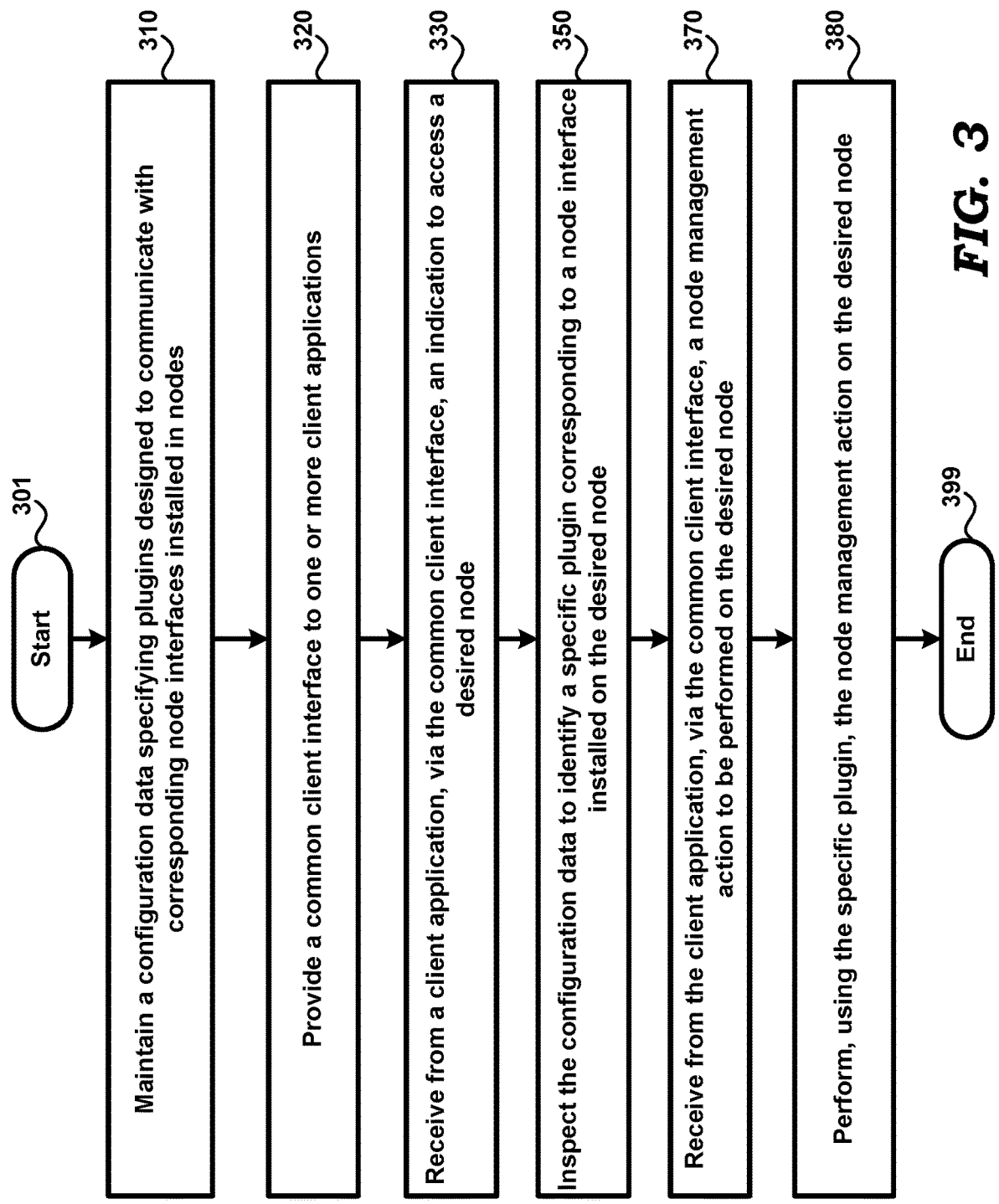
FIG. 3 is a flow chart illustrating the manner in which performance of node management actions in a computing infrastructure having diverse node interfaces is facilitated according to aspects of the present disclosure.

FIG. 3 is a flow chart illustrating the manner in which performance of node management actions in a computing infrastructure having diverse node interfaces is facilitated according to aspects of the present disclosure. The flowchart is described with respect to the systems of FIGS. 1 and 2, in particular node manager 150, merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 301, in which control immediately passes to step 310.

In step 310, node manager 150 maintains a configuration data specifying plugins designed to communicate with corresponding node interfaces (vendor library 280A-280C and/or vendor driver 270A-270C) installed in nodes 160 of computing infrastructure 130. The plugins are corresponding implementations of a common client interface, which is provided to client applications. The common client interface implies that each client application can use the same client interface definition (syntax/semantics) to invoke any of the plugins for the same node management action. However, each plugin may be implemented to communicate with a specific node interface (vendor driver) according to the interface definition of the desired node.

The configuration data may be maintained internally (for example, in a hard disk within node manager 150) or in an external data store (not shown in FIG. 1) associated with node manager 150. The configuration data may be maintained in any convenient format, such as, a file or a table in a database server according to relational database technologies.

In step 320, node manager 150 provides the common client interface to one or more client applications (such as 290A-290B) executing in clients 210A-210B. The common client interface may be exposed as an Application Programming Interface (API) containing one or more functions that can be invoked by the client applications.

In step 330, node manager 150 receives from a client application (e.g., 290B), via the common client interface, an indication to access a desired node (e.g., node 160-23). The indication may be received when a corresponding function (such as a "get_plugin" function) of the API is invoked by the client application.

In one embodiment, credentials are required to be sent to a node interface (here, 270C) for access/performance of node management actions on a desired node (160-23). Such credentials may already be maintained in credential store 240, with client application (290B) retrieving and sending the appropriate credentials along with the indication. In other words, node manager 150 receives the credentials along with the indication in step 330.

In step 350, node manager 150 inspects the configuration data to identify a specific plugin corresponding to a node interface installed on the desired node. The inspecting may be performed in a known way, for example using a SQL query containing the identifier of the desired node when the configuration data is maintained as a table according to relational database technologies. For example, for the above noted indication, node manager 150 determines the specific plugin 420D (described in below sections) corresponding to the node interface 270C installed on node 160-23.

Node manager 150 thereafter maintains, in a volatile or non-volatile memory, an association between the client application and the identified specific plugin in view of the indication (received in step 330) and the inspecting identifying the specific plugin (in step 350). Such an association facilitates the identification of the specific plugin to be performed once, with the specific plugin being thereafter used for performing multiple node management actions, thereby reducing the overhead associated with the identification of plugins.

In step 370, node manager 150 receives from the client application (290B), via the common client interface, a node management action to be performed on the desired node (160-23). The node management action may be one of booting-up the node, shutting down the node, resetting/restarting the node, update of hypervisor/operating system, update of BIOS, capturing Event Logs generated by the system software, etc.

In step 380, node manager 150 performs, using the specific plugin, the node management action on the desired node (160-23). The specific plugin in turn communicates with the node interface (270C) installed on the desired node (160-23). The specific plugin also communicates the credentials (received along with the indication) to node interface (270C) for the performance of the node management action. The flow chart ends in step 399.

Thus, node manager 150 facilitates performance of node management actions in computing infrastructure 130 having diverse node interfaces. By use of the configuration data in identifying the specific plugin, the user/client application (290B) is relieved of the burden of keeping track of the different node interfaces implemented in nodes 160 of computing infrastructure 130.

The manner in which node manager 150 provides several aspects of the present disclosure according to the steps of FIG. 3 is illustrated below with examples.

5. Illustrative Example

FIGS. 4A-4C and 5A-5C together illustrate the manner in which performance of node management actions in a computing infrastructure having diverse node interfaces is facilitated in one embodiment. Each of the Figures is described in detail below.

Node manager 150 according to an aspect of the present disclosure, exposes a common client interface to client applications (290A-290B) for performance of node management actions on nodes 160 having different/diverse node interfaces (270A-280A, 270B-280B, etc.). Accordingly, the client application can be implemented agnostic of any vendor specific implementations of the node interfaces. The addition of nodes from new or existing vendors is accordingly simplified.

In one embodiment described below, the node interactions (sending of requests to the nodes for performing node management actions and receiving corresponding responses) for each vendor is abstracted as a corresponding plugin. Thus, addition of a support for a new vendor driver (from a new vendor or a new implementation/version from an existing vendor) entails just an addition of a new plugin (without affecting the common client interface exposed to the client applications). The details of such a pluggable node manager are described below with examples.

Figure 4A:
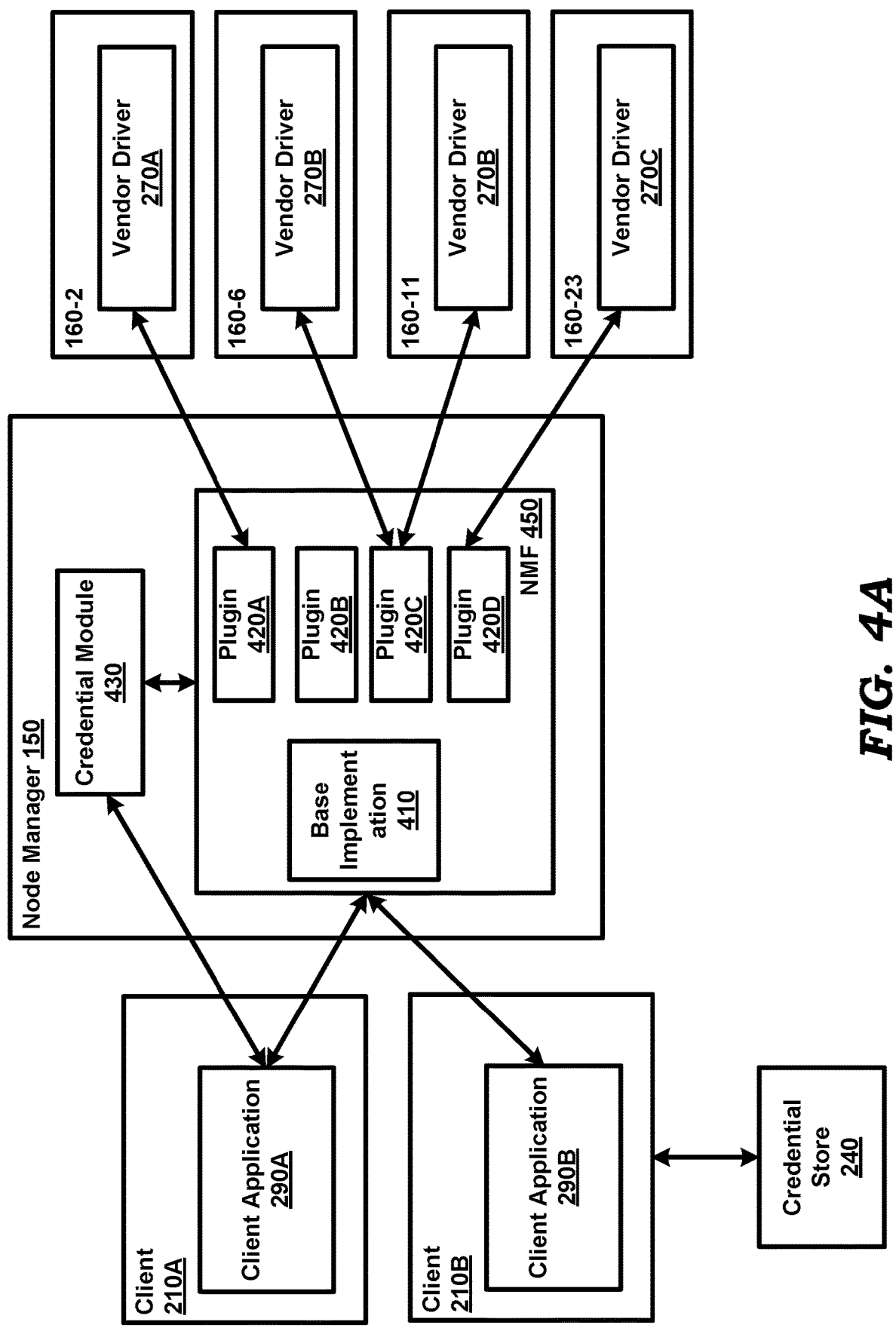
FIG. 4A depicts the manner in which a pluggable node manager is provided according to an aspect of the present disclosure.

FIG. 4A depicts the manner in which a pluggable node manager (150) is provided according to an aspect of the present disclosure. The block diagram is shown containing credential module (CM) 430 and node management framework (NMF) 450 executing in node manager 150. NMF 450 in turn is shown containing base implementation 410 and plugins 420A-420D. Each of the blocks of FIG. 4A is described in detail below.

Credential module (CM) 430, provided as a part of node manager 150, facilitates the generation of credentials for new users according to an aspect of the present disclosure. In one embodiment, CM 430 receives a request for creating a new user from client applications (here 290A), generates a set of credentials for a new user by invoking functions provided by NMF 450 and then provides the generated set of credentials to the client application (290A). The generated set of credentials may then be sent by client application to NMF 450 for performance of specific node management actions on desired nodes. Such a feature may relieve the client application/developer from the burden of creating the credentials required for the performance of node management actions.

Node Management Framework (NMF) 450, provided as a part of node manager 150, provides a common client interface to client applications (290A-290B) for interacting with diverse/different vendor drivers (270A-270C). According to an aspect, NMF 450 provides a base implementation 410 and a set of plugins (420), which together operate to provide several aspects of the present disclosure. In one embodiment, NMF 450 is shipped as a framework egg (file format) and a set of plugin tars (file format). Each plugin tar contains plugins egg, plugin metadata configuration data and a set of tools, which plugin references. These plugins can be extracted into a directory pointed by framework to be useful.

Base implementation 410 specifies the common/minimum set of functions that are to be implemented by all plugins 420. Base implementation 410 also provides driver detection and plugin selection. Depending on the information provided, base implementation 410 provides the client application with a suitable plugin (selected based on configuration data). Client applications can then perform desired node management actions (BMC operations) using the common client interface of base implementation 410.

Each of plugins 420 represents a corresponding executable module provided by vendors for interfacing with their corresponding vendor driver. In particular, each plugin is designed to send requests to/receive responses from (communicate with) a corresponding vendor driver for the performance of different node management actions. In other words, plugins provide vendor specific implementation of common node management actions and hide all the vendor specific idiosyncrasies and enabling clients to be provided a common client interface (base implementation 410) for node interactions.

In one embodiment, plugins 420 are organized at vendor level and are present in an egg file (format) contained in the plugin directory of a specific vendor. The vendor-specific directory keeps the plugin metadata config and also allows vendors to keep any vendor specific tools they may need to perform node management actions. Such an organization helps keep vendor specific code/data/utilities in a vendor level pack.

It may be appreciated that the set of plugins (420A-420D) can be expanded over time. Plugins can be outsourced to vendors/partners and can be integrated seamlessly into node manager 150. Such an architecture simplifies the development and maintenance of code for node interactions for multiple node interfaces. An example architecture of a pluggable node manager is described in detail below.

6. Base Implementation, Plugins and Configuration Data

Figure 4B:
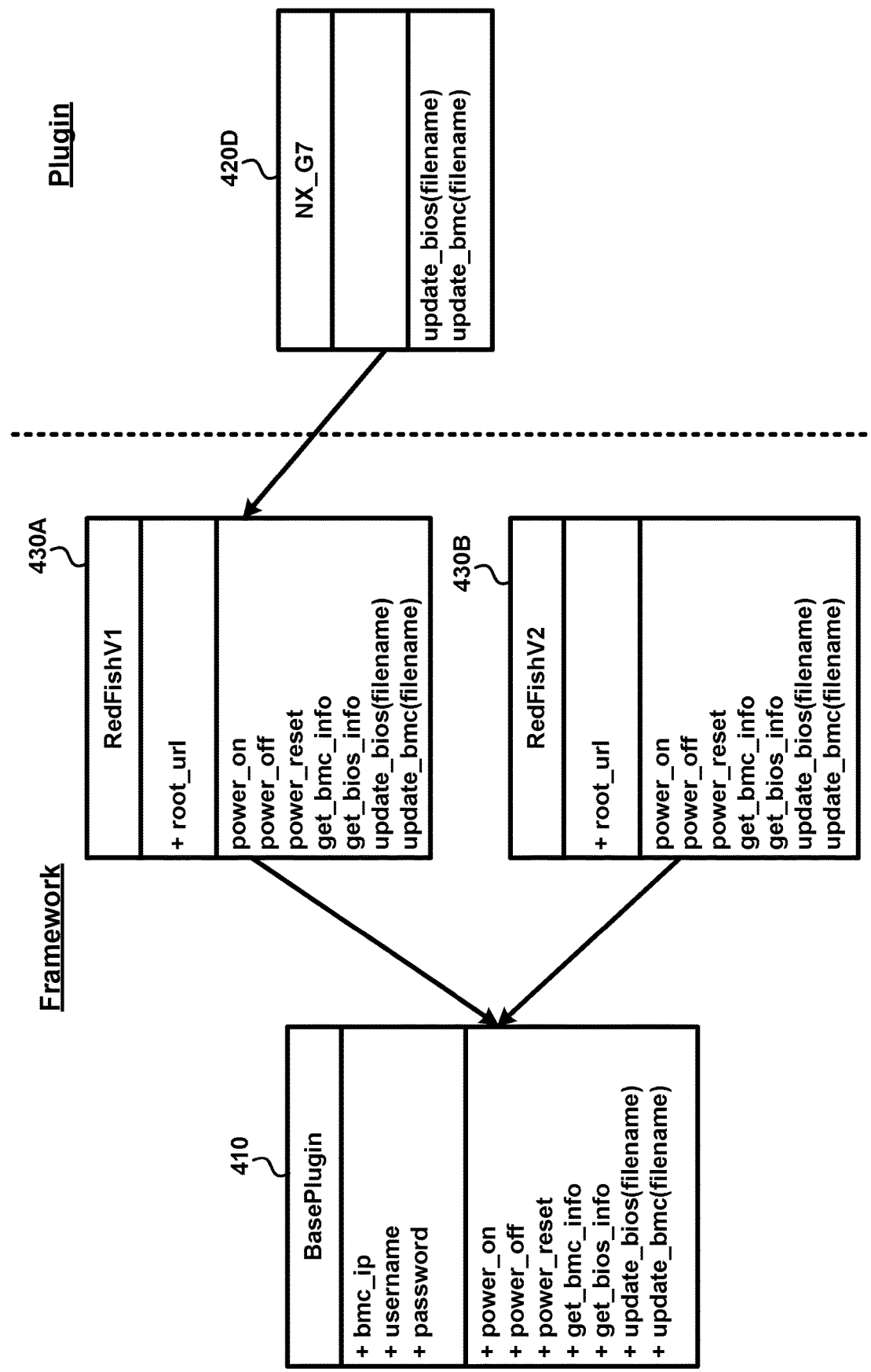
FIG. 4B depicts the architecture of a pluggable node manager in one embodiment.

FIG. 4B depicts the architecture of a pluggable node manager (150) in one embodiment. BasePlugin (base implementation 410) is part of the base framework (450) and sets the expectations in terms of what all the node management actions are supported by the different plugins. For example, BasePlugin 410 indicates that each plugin may have the functions/methods "power_on", "power_off", etc.

Plugins 430A-430B represent corresponding base plugins that Redfish[R] implementations. As is well known, Redfish [R] is a standard designed to deliver simple and secure management for computing infrastructures. More details on Redfish are available from DMTF (formerly known as the Distributed Management Task Force) 1050 SW 6th Avenue, #1100 Portland, OR 97204. Redfish allows REST based interfaces (275 and 285) to perform management operations and is rich to support vendor specific implementations too. Redfish API can allow full inventory of the server, control power and reset, configure BIOS and BMC settings, fetch event logs, as well as many other functions. Such implementations help in moving away from vendor specific tools to usage of REST APIs for communication with BMC for most management operations. However, vendors typically adhere to different versions of Redfish specifications (and thus 430A-430B) and may also not completely implement all the functions using Redfish.

Plugins may inherit directly from BasePlugin (BasePlugin) or from a Legacy/Redfish conformant plugin (430A-430B). Vendor specific functions can be overridden by the plugin based on the node management action sought to be performed. Thus, plugin 420B indicates that the functions update_bios(filename) and update_bmc(filename) have vendor specific implementations that override the corresponding implementations in plugin 430A, and thereby overriding the corresponding implementations in base plugin 410 (by inheritance, as is well known in the art). In one embodiment where base plugins and plugins are implemented using object-oriented programming, base implementation 410 is implemented as an abstract/virtual class containing one or more virtual/abstract functions that are overridden by the corresponding implementations in the plugin classes.

Thus, vendors may provide different vendor specific plugins 420 that are pluggable into NMF 450. In addition, each plugin is accompanied by a configuration data that specifies the details of the plugin. The details of such configuration data are described in detail below.

FIG. 4C depicts portions of a configuration data specifying the details of a plugin in one embodiment. For illustration, the configuration data is shown maintained according to JSON (JavaScript Object Notation). However, in alternative embodiments, the configuration data may be maintained according to other data formats (such as extensible markup language (XML), etc.) and/or using other data structures (such as database tables, lists, trees, etc.), as will be apparent to one skilled in the relevant arts by reading the disclosure herein.

Data portion 440 depicts the configuration data specifying the details of plugin 420D. Line 441 indicates the name of plugin 420D as "nx_g7", while line 442 indicates the list of models/nodes supported by plugin 420D. Lines 443 and 444 respectively indicate the BMC (vendor driver) versions unsupported and supported by plugin 420D. Line 445 indicates the manufacturer/vendor of plugin 420B as "supermicro".

Similarly, NMF 450 receives the configuration data corresponding to other plugins (420A-420C). It may be appreciated that maintaining configuration data independent of the plugins avoid loading any unnecessary code into memory since all decisions (identification of a suitable plugin) can be based on the configuration data.

Thus, NMF 450 is implemented as a base implementation (410) and a set of plugins (420). The manner in which a client application (290A-290B) interacts with NMF 450 for performance of a desired node management action is described below with examples.

7. Performing a Node Management Action

FIG. 5A depicts the manner in which plugins are used by clients in one embodiment. Specifically, the Figure depicts sample client code in client application 290B for node interactions using a plugin for NX G7 platforms (plugin 420D shown above). The sample client code is shown both with auto-detection of the plugin with credentials provided (code portion 510) and also with auto-detection of the plugin with credentials generated on the fly (code portion 520). Code portion 510 is assumed to be part of client application 290B, code portion 520 is assumed to be part of client application 290A, while lines 501 and 502 are assumed to be part of both client applications 290A-290B.

Line 501 indicates that get_plugin( ) function is sought to be imported from the module "redpool.base_plugin", which is one of the modules (API) exposed by NMF 450. Line 502 indicates that the create_user( ) and delete_user( ) functions are sought to be imported from the module "credmod", which is one of the modules (API) exposed by CM 430.

Code portion 510 indicates sample code that is used for auto-detection of plugins with credentials provided. In line 511, the get_plugin( ) function of the common client interface (base implementation 410) is invoked by client application 290B with the IP address (BMC_IP) of the desired node (here, 16-23) and also the required credentials (USERNAME and PASSWORD). Lines 512 and 513 specify respective node management actions (get_power_state and power_reset) to be performed on the desired node 160-23.

It should be noted that the BMC_IP address may be an external BMC IP address or an internal vUSB NIC IP address. In addition, the USERNAME and PASSWORD are valid credentials retrieved from credential store 240 (in view of the credentials being previously created and stored in credential store 240).

Upon execution of line 511, NMF 450 receives an indication that the node management action is to be performed on node 160-23. NMF 450 accordingly identifies plugin 420D as the suitable plugin for interfacing with vendor driver 270C installed on the desired node 160-23. NMF 450 also stores the credentials (USERNAME, PASSWORD) provided along with the indication. NMF 450 (in particular base implementation 410) performs the identification of plugin based on the configuration data exposed by each vendor (here the portion of configuration data shown in FIG. 4C). It should be noted that the configuration data provides enough information of all the plugins and their corresponding manufacturer name (line 445), BMC version (lines 443 and 444) and model string (line 442). These three data items together can help choose a plugin if it exists. NMF 450 also maintains, in a volatile or non-volatile memory, an association between client application 290B and plugin 420D.

Upon execution of lines 512 and 513, NMF 450 performs the respective node management actions by executing the corresponding implementations in plugin 420D (based on the association). If no implementation is provided in plugin 420D, the base implementation of the requested node management action in base implementation 410 is executed. The execution of the appropriate implementation causes the plugin/NMF to communicate (along with the credentials provided/stored earlier) with vendor driver 270C to cause the requested node management action to be performed in desired node 160-23. It should be noted that from the view point of client application 290B, all the node management actions are provided as part of base implementation 410 (common client interface), with NMF 450 using the appropriate plugin (based on the association) for performance of the requested node management actions.

It may be appreciated that a new node interface (for example, vendor driver 270D not shown in FIG. 4A) may be installed on the desired node (160-23) at a time instance following the performing of the node management actions (noted above in code portion 510). A corresponding new plugin (for example, plugin 420E not shown in FIG. 4A) is also installed as part of NMF 450. The manner in which such a new node interface is handled by NMF 450 upon execution of code portion 510 after the time instance is described in detail below.

Upon execution of line 511 after the time instance, NMF 450 receives an indication that the node management action is to be performed on node 160-23. NMF 450 accordingly identifies plugin 420E as the suitable plugin for interfacing with vendor driver 270D installed on the desired node 160-23. NMF 450 NMF 450 also stores the credentials provided along with the indication and update the association (maintained earlier) as being between client application 290B and plugin 420E. Upon execution of lines 512 and 513 after the time instance, NMF 450 performs the respective node management actions by executing the corresponding implementations in plugin 420E (based on the updated association).

According to an aspect, node manager 150 (in particular, CM 430) generates any credentials required to perform a requested node management action on a specified node. The manner in which client application 290A causes such generation and usage of the generated credentials is described in detail below.

Code portion 520 indicates sample code that is used for auto-detection of plugins with credentials generated on the fly, that is, dynamically without requiring the user to create the credentials previously (prior to execution of client application). In line 521, the create_user( ) function of the API exposed by CM 430 is invoked by client application 290A with the IP address (BMC_IP) of the desired node (here, 16-23). Upon invocation, CM 430 generates a set of credentials (USERNAME and PASSWORD) by interacting with NMF 450, and provides the generated set of credentials as a user object (assigned to "user").

Lines 522-524 operate similar to lines 511-513 noted above, and accordingly their description is not repeated for conciseness. It may be observed that in line 522, the newly generated set of credentials for the new user are passed (using "user.get_username( )" and "user.get_password( )") instead of the previously stored USERNAME and PASSWORD in line 511. In line 525, the delete_user( ) function is invoked to cause the newly created user to be deleted (to ensure that the new user credentials are not used for the performance of any additional node management actions). Thus, the client application/developer is relieved from the burden of creating the credentials required for the performance of node management actions (in lines 523 and 524).

It may be appreciated that various components of node manager 150 are operative during the performance of requested node management actions. The operation of the various components such as CM 430 and NMF 450 (base implementation 410, plugins 420A-420D, etc.) of node manager 150 is described below with examples.

Figure 5B:
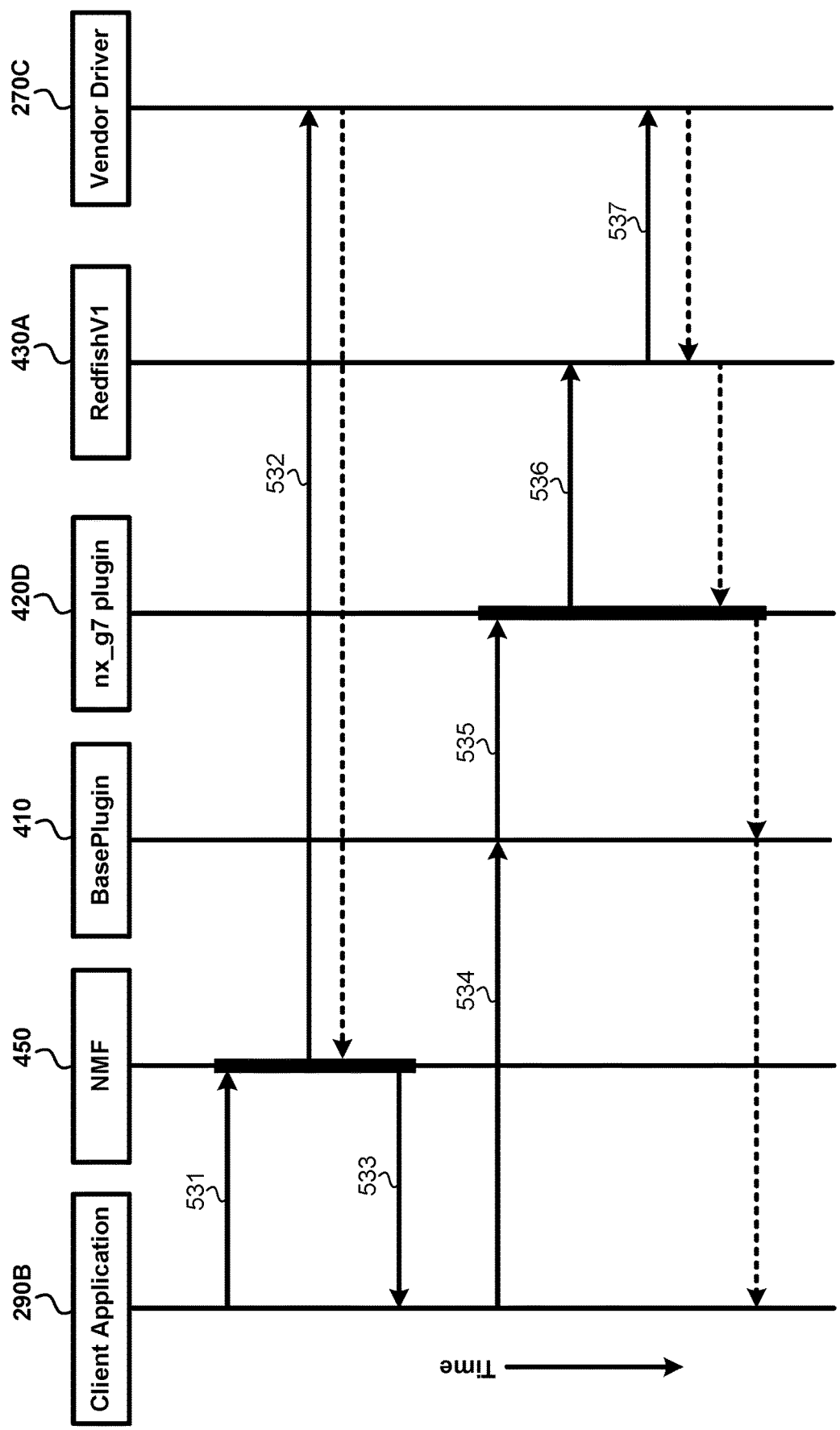
FIG. 5B is a sequence diagram illustrating the operation of various components of a node manager for performance of a node management action in one embodiment.

FIG. 5B is a sequence diagram illustrating the operation of various components of a node manager (150) for performance of a node management action in one embodiment. In particular, the operation of the components is shown with respect to execution of the sample client code shown in code portion 510 of FIG. 5A.

At 531, client application 290B sends an indication to NMF 450 of the desired node (160-23) on which node management actions are sought to be performed. The credentials (USERNAME and PASSWORD) for accessing the node are also sent along with indication. In response to the indication, NMF 450 detects that vendor driver 270C is installed in desired node 160-23 (at 532), identifies the nx_g7 plugin (420D) as the plugin suitable for interfacing with vendor driver 270C, maintains an association between client application 290B and nx_g7 plugin and returns control back to client application 290B (at 533). In one embodiment, NMF 450 retrieves (at 532) the manufacturer name, BMC version and model string of the vendor driver installed in desired node 160-23 and then finds a plugin whose configuration data (lines 442-445) matches the retrieved three data items. If there is a match on the three data items, the plugin is identified as the suitable plugin.

At 534, client application 290B invokes a node management action (assumed to be power reset for illustration) exposed by base implementation 410 (common client interface), which in turn causes the execution of the same node management action in nx_g7 plugin (based on the association) at 535. At 536, nx_g7 plugin in response to request to perform the power reset node management action, invokes the corresponding implementation of power reset in RedFishV1 base plugin 430A, which in turn communicates with vendor driver 270C to cause the performance of the action power reset in desired node 160-23 (at 537).

Thus, various components of node manager 150 operate to cause the performance of a node management action in a desired node in computing infrastructure 130. The manner in which node management actions are performed with credentials generated on the fly is described in detail below.

Figure 5C:
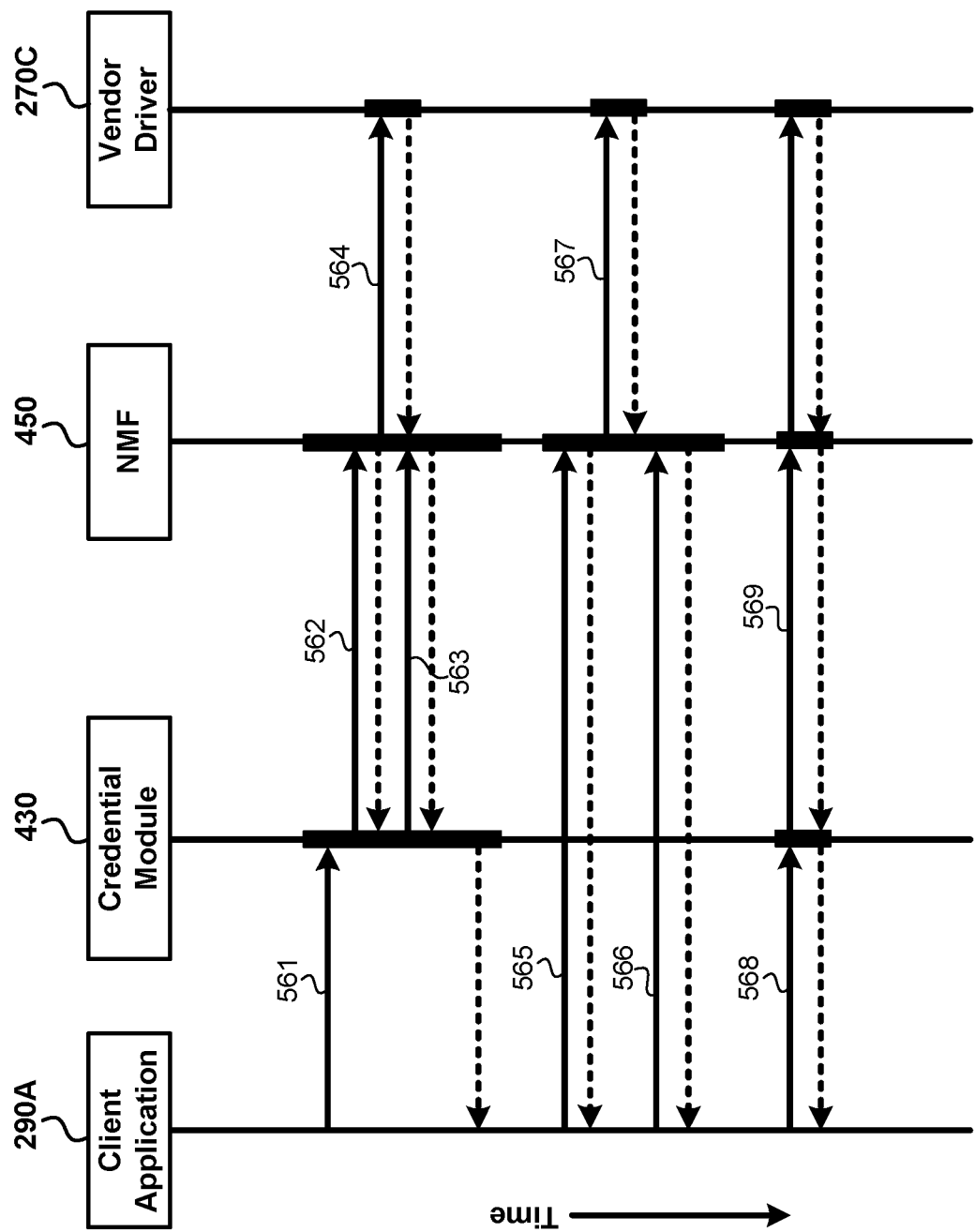
FIG. 5C is a sequence diagram illustrating the operation of various components of a node manager for performance of a node management action with credentials generated on the fly in one embodiment.

FIG. 5C is a sequence diagram illustrating the operation of various components of a node manager (150) for performance of a node management action with credentials generated on the fly in one embodiment. In particular, the operation of the components is shown with respect to execution of the sample client code shown in code portion 520 of FIG. 5A.

At 561, client application 290A sends a create_user request to CM 430 for creation of a new user. The request includes the IP address of the desired node (160-23) on which node management actions are sought to be performed. In response to the request, CM 430 invokes one or more functions (e.g., "create_user( )", "delete_user( )", etc.) exposed by NMF 450. Specifically, at 562, CM 430 invokes NMF 450 for the creation of a new user for the desired node (160-23), while at 563, CM 430 sends a request to NMF 450 to enable an interface and configure the host/desired node (160-23).

At 564, NMF 450 performs the creation of a new/custom user and enabling the interface on the desired node by using vendor specific tools (like ipmicfg and racadm, etc.). In particular, NMF 450 uses the vendor specific tools to send requests to vendor driver 270C to cause the creation of the user dynamically in the desired node. In one embodiment, NMF 450 implements "create_user( )" function using the command "ipmicfg -user add <userid><username><password><permission>", and the "delete_user( )" function using the command "ipmicfg -user del <user-id>".

Similarly, NMF 450 implements enabling of the (vUSB NIC) interface using the command "ipmitool raw 0x30 0xb5 1 1" and the disabling of the interface using the command "ipmitool raw 0x30 0xb5 1 0". Additional commands such as "ifconfig <interface-name>169.254.3.1 netmask 255.255.255.0 up" and "esxcfg-vswitch -M vusb0 -p host-bmc-pg vSwitchBmc" may also be executed for configuration of the interface using corresponding vendor specific tools.

Upon successful creation of the new user, NMF 450 provides the set of credentials (username and password) of the new user to CM 430, which in turn provides the set of credentials to client application 290A as a response to the create_user request received at 561.

At 565, client application 290A sends an indication to NMF 450 of the desired node (160-23) on which node management actions are sought to be performed. The indication is sent along with the set of credentials generated for the new user at 561. Upon receiving control after identification of the suitable plugin for the desired node, client application 290A sends, at 566, the node management action (update request) to NMF 450, in particular, to the base implementation which in turn forwards to suitable plugin in NMF 450, as noted above in FIG. 5B. NMF 450 (in particular, the suitable plugin) in turn communicates with the vendor driver (270C) installed on the desired node and causes the performance of the requested node management action at 567. 565, 566 and 567 may be performed similar to 531, 534/535 and 537 of FIG. 5A, and accordingly, their description is not repeated here for conciseness.

At 568, client application 290A sends a request to CM 430 to disable the interface and delete the custom user. CM 430, in turn at 569, invokes the API of NMF 450, for example, the "delete_user( )" function exposed by NMF 450 for the deletion of the custom user. NMF 450 performs the requested deletion by executing commands of vendor specific tools, as noted above. The deletion of the custom user ensures that the same credentials (of the custom user) cannot be used for performance of other node management actions.

Thus, various components of node manager 150 operate to cause the performance of a node management action in a desired node with credentials generated on the fly in computing infrastructure 130.

It should be appreciated that the plugin-based architecture (for the node manager) helps new functionalities to be added dynamically and helps improve vendor/partner collaboration to add implementations specific to their vendor driver (BMC). In addition, a common client interface helps provide an abstraction for hiding any implementation-based differences and provides any client application a seamless way to communicate with any vendor driver (BMC).

Furthermore, NMF 450 is implemented as a cross-platform library, thereby enabling its usage from a hypervisor client as well. NMF 450 is configuration based and this helps avoid unnecessary loading of plugins/code into memory. Only the plugins which are required (determined based on the configuration data) are loaded in memory. Auto-discovery of plugins is enabled—since plugins are loaded based on configuration data, any new plugin can be loaded dynamically as they are added to the system. In addition, it is easy to add/test plugins—since plugins can be auto-discovered, any new plugins during testing can be added and tested during development too.

NMF 450 organizes plugins specific to a manufacturer in a bundle and provides update granularity at manufacturer level. NMF 450 provides less bulky Foundation builds as the Foundation Factory builds can be with single vendor plugins. A client application (such as a LCM middleware application) can package plugins as modules and copy only plugins required for a single manufacturer when performing node management actions (BMC operations) from the client.

It should be further appreciated that the features described above can be implemented in various embodiments as a desired combination of one or more of hardware, software, and firmware. The description is continued with respect to an embodiment in which various features are operative when the software instructions described above are executed.

8. Digital Processing System

Figure 6:
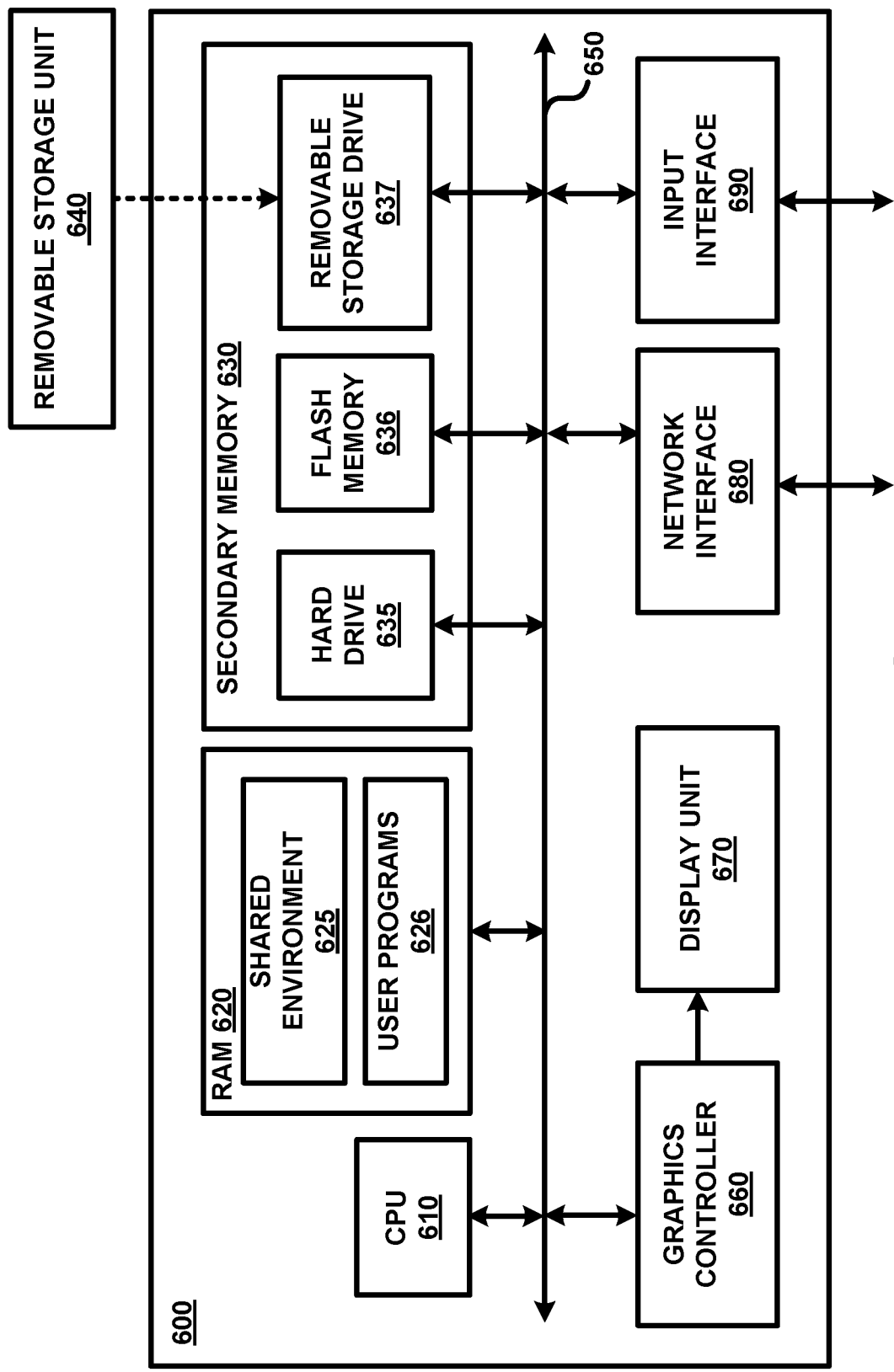
FIG. 6 is a block diagram illustrating the details of a digital processing system in which various aspects of the present disclosure are operative by execution of appropriate executable modules.

FIG. 6 is a block diagram illustrating the details of digital processing system 600 in which various aspects of the present disclosure are operative by execution of appropriate executable modules. Digital processing system 600 may correspond to node manager 150 or any system implementing node manager 150.

Digital processing system 600 may contain one or more processors such as a central processing unit (CPU) 610, random access memory (RAM) 620, secondary memory 630, graphics controller 660, display unit 670, network interface 680, and input interface 690. All the components except display unit 670 may communicate with each other over communication path 650, which may contain several buses as is well known in the relevant arts. The components of FIG. 6 are described below in further detail.

CPU 610 may execute instructions stored in RAM 620 to provide several features of the present disclosure. CPU 610 may contain multiple processing units, with each processing unit potentially being designed for a specific task. Alternatively, CPU 610 may contain only a single general-purpose processing unit.

RAM 620 may receive instructions from secondary memory 630 using communication path 650. RAM 620 is shown currently containing software instructions constituting shared environment 625 and/or other user programs 626 (such as other applications, DBMS, etc.). In addition to shared environment 625, RAM 620 may contain other software programs such as device drivers, virtual machines, etc., which provide a (common) run time environment for execution of other/user programs.

Graphics controller 660 generates display signals (e.g., in RGB format) to display unit 670 based on data/instructions received from CPU 610. Display unit 670 contains a display screen to display the images defined by the display signals. Input interface 690 may correspond to a keyboard and a pointing device (e.g., touch-pad, mouse) and may be used to provide inputs. Network interface 680 provides connectivity to a network (e.g., using Internet Protocol), and may be used to communicate with other systems (of FIG. 1) connected to the networks (120 and 140).

Secondary memory 630 may contain hard drive 635, flash memory 636, and removable storage drive 637. Secondary memory 630 may store the data (for example, data portions shown in FIGS. 4A-4C, etc.) and software instructions (for example, for implementing the flows shown in FIGS. 3 and 5A-5C, etc.), which enable digital processing system 600 to provide several features in accordance with the present disclosure. The code/instructions stored in secondary memory 630 may either be copied to RAM 620 prior to execution by CPU 610 for higher execution speeds, or may be directly executed by CPU 610.

Some or all of the data and instructions may be provided on removable storage unit 640, and the data and instructions may be read and provided by removable storage drive 637 to CPU 610. Removable storage unit 640 may be implemented using medium and storage format compatible with removable storage drive 637 such that removable storage drive 637 can read the data and instructions. Thus, removable storage unit 640 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 640 or hard disk installed in hard drive 635. These computer program products are means for providing software to digital processing system 600. CPU 610 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 630. Volatile media includes dynamic memory, such as RAM 620. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 650. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

9. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A method implemented in a server system, the method comprising:
    maintaining a configuration data specifying a plurality of plugins, each plugin able to communicate with a corresponding node interface of a plurality of node interfaces of a computing infrastructure,
    wherein each plugin of the plurality of plugins is a respective implementation of a common client interface provided to client applications, wherein the common client interface is a base plugin comprising a common set of virtual functions,
    wherein each plugin comprises a set of functions implementing said common set of virtual functions, wherein each function of the set of functions upon invocation performs a corresponding node management action,
    wherein each node interface requires a corresponding set of credentials to be provided for performance of node management actions on the corresponding node;
    receiving from a client application executing on a client system, a request for credentials for a first node of the computing infrastructure;
    generating, by communicating with a first node interface installed on the first node, a first set of credentials for a new user;
    providing the first set of credentials to the client application;
    receiving from the client application, a first indication to access the first node of the computing infrastructure, wherein the first set of credentials are received along with the first indication from the client application;
    in response to the first indication received from the client application:
        inspecting the configuration data to identify a first plugin, wherein the first plugin is contained in the plurality of plugins and is indicated in the configuration data to correspond to the first node interface installed on the first node of the computing infrastructure;
        maintaining an association between the client application and the first plugin in view of the first indication and the inspecting identifying the first plugin;
        sending to the client application, data representing the common client interface to the client application, wherein the data comprises details for invocation of the common set of virtual functions;
        receiving from the client application, using the common client interface, invocation of a first virtual function representing a first node management action to be performed on the first node;
        determining, in response to receiving the invocation from the client application and based on the association, that the first plugin is to be used for communicating with the first node interface for performance of the first node management action; and
        performing, by invoking a first function of the first plugin, wherein the first function is an implementation of the first virtual function in the first plugin for communicating with the first node interface installed on the first node, the first node management action on the first node of the computing infrastructure, the performing comprising sending the first set of credentials and the first node management action to the first node interface installed on the first node.

2. The method of claim 1, wherein a second node interface is installed on the first node at a second time instance following the performing of the first node management action, the method further comprising:
    receiving from the client application after the second time instance, a second indication to access the first node of the computing infrastructure;
    inspecting, in response to the second indication, the configuration data to identify a second plugin, wherein the second plugin is contained in the plurality of plugins and is indicated in the configuration data to correspond to the second node interface installed on the first node of the computing infrastructure;

updating the association as being between the client application and the second plugin in view of the second indication and the inspecting identifying the second plugin;

receiving from the client application using the common client interface, invocation of the first virtual function representing the first node management action to be performed on the first node;

determining, in response to receiving from the client application and based on the updated association, that the second plugin is to be used for communicating with the first node interface; and performing, by invoking a second function of the second plugin, wherein the second function is an implementation of the first virtual function in the second plugin for communicating with the first node interface installed on the first node, the first node management action on the first node of the computing infrastructure.

3. The method of claim 2, wherein the first node interface is provided by a first vendor and the second node interface is provided by a second vendor.

4. The method of claim 2, wherein the first node interface is an older version of the node interface provided by a first vendor and the second node interface is a newer version of the node interface provided by the first vendor.

5. The method of claim 2, wherein each of the first indication and the second indication comprises an IP address of the first node.

6. The method of claim 1, further comprising retrieving from the first node, in response to the first indication, details of the first node interface installed in the first node, wherein the inspecting is performed after the retrieving.

7. A non-transitory machine-readable medium storing one or more sequences of instructions, wherein execution of the one or more instructions by one or more processors contained in a digital processing system causes the digital processing system to perform the actions of:

maintaining a configuration data specifying a plurality of plugins designed to communicate with a corresponding plurality of node interfaces of a computing infrastructure, wherein each plugin of the plurality of plugins is a respective implementation of a common client interface provided to client applications, wherein the common client interface is a base plugin comprising a common set of virtual functions, wherein each node interface requires a corresponding set of credentials to be provided for performance of node management actions on the corresponding node, and wherein each plugin comprises a set of functions implementing said common set of virtual functions, wherein each function of the set of functions upon invocation performs a corresponding node management action;

receiving from a client application executing of a client system, a request for credentials for a first node of the computing infrastructure;

generating, by communicating with a first node interface installed on the first node, a first set of credentials for a new user, wherein the communicating comprises requesting the first node interface to create the new user with the first set of credentials in the first node;

upon successful creation of the new user with the first set of credentials in the first node, providing the first set of credentials to the client application;

receiving from the client application, a first indication to access the first node of the computing infrastructure, wherein the first set of credentials are received along with the first indication from the client application;

in response to the first indication, inspecting the configuration data to identify a first plugin of the plurality of plugins corresponding to the first node interface installed on the first node of the computing infrastructure for performance of the first node management action;

maintaining an association between the client application and the first plugin in view of the first indication and the inspecting identifying the first plugin;

receiving from the client application, via the common client interface, a first node management action to be performed on the first node;

determining, in response to receiving the invocation from the client application and based on the association, that the first plugin is to be used for communicating with the first node interface for performance of the first node management action; and performing, by invoking a first function of the first plugin, the first node management action on the first node of the computing infrastructure by sending the first set of credentials and the first node management action to the first node interface.

8. The non-transitory machine-readable medium of claim 7, further comprising one or more instructions for:

providing the common client interface to the client application as a response to the first indication, wherein the providing comprises sending to the client system, data representing the common client interface to the client application, wherein the data comprises details for invocation of the common set of virtual functions, wherein, the receiving, via the common client interface, receives an invocation of a first virtual function representing the first node management action from the client application, wherein the first function is an implementation of the first virtual function for communicating with the first node interface installed on the first node to cause performance of the first node management action on the first node of the computing infrastructure.

9. The non-transitory machine-readable medium of claim 8, wherein a second node interface is installed on the first node at a second time instance following the performing of the first node management action, further comprising one or more instructions for:

receiving from the client application after the second time instance a second indication to access the first node of the computing infrastructure, wherein the first set of credentials are received along with the second indication from the client application;

inspecting, in response to the second indication, the configuration data to identify a second plugin of the plurality of plugins corresponding to the second node interface installed on the first node of the computing infrastructure;

updating the association as being between the client application and the second plugin in view of the second indication and the inspecting identifying the second plugin in response to the second indication;

receiving from the client application, via the common client interface, the first node management action to be performed on the first node of the computing infrastructure; and performing, by invoking a second function of the second plugin based on the association, the first node management action on the first node, wherein the performing comprises the second plugin sending the first set of credentials and the first node management action to the second node interface installed on the first node.

10. The non-transitory machine-readable medium of claim 9, wherein the first node interface is provided by a first vendor and the second node interface is provided by a second vendor.

11. The non-transitory machine-readable medium of claim 9, wherein the first node interface is an older version of the node interface provided by a first vendor and the second node interface is a newer version of the node interface provided by the first vendor.

12. The non-transitory machine-readable medium of claim 9, wherein each of the first indication and the second indication comprises an IP address of the first node.

13. A digital processing system comprising:
a random access memory (RAM) to store instructions; and
one or more processors to retrieve and execute the instructions, wherein execution of the instructions causes the digital processing system to perform the actions of:
maintaining a configuration data specifying a plurality of plugins, each plugin able to communicate with a corresponding node interface of a plurality of node interfaces of a computing infrastructure,
wherein each plugin of the plurality of plugins is a respective implementation of a common client interface provided to client applications, wherein the common client interface is a base plugin comprising a common set of virtual functions,
wherein each plugin comprises a set of functions implementing said common set of virtual functions, wherein each function of the set of functions upon invocation performs a corresponding node management action,
wherein each node interface requires a corresponding set of credentials to be provided for performance of node management actions on the corresponding node;
receiving from a client application executing on a client system, a request for credentials for a first node of the computing infrastructure;
generating, by communicating with a first node interface installed on the first node, a first set of credentials for a new user;
providing the first set of credentials to the client application;
receiving from the client application, a first indication to access the first node of the computing infrastructure, wherein the first set of credentials are received along with the first indication from the client application;
in response to the first indication:
inspecting the configuration data to identify a first plugin, wherein the first plugin is contained in the plurality of plugins and is indicated in the configuration data to correspond to the first node interface installed on the first node of the computing infrastructure;
maintaining an association between the client application and the first plugin in view of the first indication and the inspecting identifying the first plugin;
sending to the client application, data representing the common client interface to the client application, wherein the data comprises details for invocation of the common set of virtual functions;
receiving from the client application, using the common client interface, invocation of a first virtual function representing a first node management action to be performed on the first node;
determining, in response to receiving the invocation from the client application and based on the association, that the first plugin is to be used for communicating with the first node interface for performance of the first node management action; and
performing, by invoking a first function of the first plugin, wherein the first function is an implementation of the first virtual function in the first plugin for communicating with the first node interface installed on the first node, the first node management action on the first node of the computing infrastructure, the performing comprising sending the first set of credentials and the first node management action to the first node interface installed on the first node.

14. The digital processing system of claim 13, wherein a second node interface is installed on the first node at a second time instance following the performing of the first node management action, further performing the actions of:
receiving from the client application after the second time instance, a second indication to access the first node of the computing infrastructure;
inspecting, in response to the second indication, the configuration data to identify a second plugin, wherein the second plugin is contained in the plurality of plugins and is indicated in the configuration data to correspond to the second node interface installed on the first node of the computing infrastructure;
updating the association as being between the client application and the second plugin in view of the second indication and the inspecting identifying the second plugin;
receiving from the client application using the common client interface, invocation of the first virtual function representing the first node management action to be performed on the first node;
determining, in response to receiving from the client application and based on the updated association, that the second plugin is to be used for communicating with the first node interface; and
performing, by invoking a second function of the second plugin, wherein the second function is an implementation of the first virtual function in the second plugin for communicating with the first node interface installed on the first node, the first node management action on the first node of the computing infrastructure.

15. The digital processing system of claim 14, wherein the first node interface is provided by a first vendor and the second node interface is provided by a second vendor.

16. The digital processing system of claim 14, wherein the first node interface is an older version of the node interface provided by a first vendor and the second node interface is a newer version of the node interface provided by the first vendor.

* * * * *